US010666751B1

(12) United States Patent
Price et al.

(10) Patent No.: US 10,666,751 B1
(45) Date of Patent: May 26, 2020

(54) NOTIFICATION SYSTEM AND METHOD

(71) Applicant: Wells Fargo Bank, N.A., San Francisco, CA (US)

(72) Inventors: James E. Price, Bluffton, SC (US); James R. Seeley, Charlotte, NC (US); Ami Warren Lyman, Matthews, NC (US); Jack W. Zaney, Huntersville, NC (US); Joy Sebrina Berry, Charlotte, NC (US); Claes Dahlstrand, Charlotte, NC (US); Ralph H. Groce, III, Stroudsburg, PA (US); Kanwaljit Khurana, Huntersville, NC (US); Robert Charles Wilson, Jr., Matthews, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 179 days.

(21) Appl. No.: 15/393,070

(22) Filed: Dec. 28, 2016

(51) Int. Cl.
*H04L 29/08* (2006.01)

(52) U.S. Cl.
CPC .............. *H04L 67/26* (2013.01); *H04L 67/20* (2013.01); *H04L 67/306* (2013.01); *H04L 67/34* (2013.01)

(58) Field of Classification Search
CPC ....... H04L 67/24; H04L 67/20; H04L 67/306; H04L 67/34
See application file for complete search history.

(56) References Cited

U.S. PATENT DOCUMENTS 6,671,805 B1 12/2003 Brown et al.
7,016,870 B1 3/2006 Jones et al.
7,055,094 B2 5/2006 Imielinski et al.
7,319,881 B2 1/2008 Endo
7,788,155 B2 8/2010 Jones et al.
7,945,783 B2 5/2011 Kent et al.
8,010,663 B2 8/2011 Firminger et al.

(Continued)

FOREIGN PATENT DOCUMENTS

WO 2011094734 8/2011

OTHER PUBLICATIONS

"U.S. Appl. No. 15/484,426, Non Final Office Action dated Feb. 28, 2019", 11 pgs.

(Continued)

*Primary Examiner* — June Y Sison
(74) *Attorney, Agent, or Firm* — Schwegman Lundberg & Woessner, P.A.

(57) ABSTRACT

A system includes at least one hardware processor and a memory storing instructions which, when executed, cause the hardware processor to perform operations including identifying a notification trigger configured by a user of a target computing device, the notification trigger including at least one trigger condition and notification content, the trigger condition references a value from a trigger data source and includes a condition based on the value, the notification content includes content provided by the user, receiving the value from the trigger data source, determining, based on the value, that the at least one trigger condition is satisfied, and presenting the notification content to the user on a target computing device associated with the user, the notification content is presented in a target content venue configured to present third-party advertisements to the user.

17 Claims, 7 Drawing Sheets

(56) References Cited

U.S. PATENT DOCUMENTS

| | | |
|---|---|---|
| 8,122,020 B1 | 2/2012 | Donsbach et al. |
| 8,150,617 B2 | 4/2012 | Manber et al. |
| 8,185,463 B1 | 5/2012 | Ball |
| 8,234,302 B1 | 7/2012 | Goodwin et al. |
| 8,281,037 B2 | 10/2012 | Julia et al. |
| 8,407,125 B2 | 3/2013 | Jenson et al. |
| 8,635,519 B2 | 1/2014 | Everingham et al. |
| 8,966,362 B2 | 2/2015 | Smetters et al. |
| 8,978,079 B2 | 3/2015 | Pfeffer et al. |
| 9,083,746 B2 | 7/2015 | Hamid |
| 9,223,837 B2 | 12/2015 | Djugash |
| 9,342,842 B2 | 5/2016 | Sanghavi et al. |
| 2004/0002972 A1* | 1/2004 | Pather .................. G06F 9/542 |
| 2007/0112668 A1 | 5/2007 | Celano et al. |
| 2010/0183132 A1 | 7/2010 | Satyavolu et al. |
| 2011/0258049 A1* | 10/2011 | Ramer ............. G06F 17/30867 705/14.66 |
| 2012/0084248 A1 | 4/2012 | Gavrilescu |
| 2012/0290926 A1 | 11/2012 | Kapadia et al. |
| 2012/0302258 A1* | 11/2012 | Pai ......................... H04W 4/02 455/456.2 |
| 2013/0125017 A1 | 5/2013 | Kaghazian |
| 2013/0325598 A1* | 12/2013 | Shao ...................... G06Q 30/02 705/14.49 |
| 2014/0114735 A1 | 4/2014 | Isaacson et al. |
| 2014/0282102 A1 | 9/2014 | Avrahami |
| 2014/0330769 A1 | 11/2014 | Nguyen et al. |
| 2014/0365586 A1 | 12/2014 | Friborg, Jr. |
| 2014/0372429 A1 | 12/2014 | Ziklik et al. |
| 2015/0032366 A1 | 1/2015 | Man et al. |
| 2015/0066978 A1 | 3/2015 | Chakra et al. |
| 2015/0081763 A1 | 3/2015 | Sipola et al. |
| 2015/0082212 A1* | 3/2015 | Sharda .................. H04L 67/26 715/764 |
| 2015/0242645 A1 | 8/2015 | Burger et al. |
| 2015/0379583 A1 | 12/2015 | Balasubramanian et al. |
| 2016/0063850 A1 | 3/2016 | Yang et al. |
| 2016/0142783 A1 | 5/2016 | Bagga et al. |
| 2016/0371689 A1* | 12/2016 | Brown ................ G06Q 20/405 |
| 2017/0140285 A1 | 5/2017 | Dotan-cohen et al. |
| 2017/0195731 A1 | 7/2017 | Girlando et al. |
| 2017/0272505 A1 | 9/2017 | Smith |
| 2018/0176270 A1 | 6/2018 | Griffin et al. |

OTHER PUBLICATIONS

"U.S. Appl. No. 15/484,419, Non Final Office Action dated Feb. 8, 2019".

"U.S. Appl. No. 15/484,419, Response filed May 8, 2019 to Non Final Office Action dated Feb. 8, 2019", 10 pgs.

Dimou, Anastasia, "Mapping Hierarchical Sources into RDF using the RML Mapping Language", (May 20, 2015), 8 pgs.

"U.S. Appl. No. 15/484,419, Final Office Action dated Jul. 29, 2019".

"U.S. Appl. No. 15/484,419, Response filed Nov. 27, 2019 to Final Office Action dated Jul. 29, 2019", 11 pgs.

"U.S. Appl. No. 15/484,419, Advisory Action dated Dec. 9, 2019", 3 pgs.

* cited by examiner

US 10,666,751 B1

NOTIFICATION SYSTEM AND METHOD

TECHNICAL FIELD

Embodiments described herein generally relate to notification systems and, for example and without limitation, to software systems and methods for communicating computer-implemented notifications to users.

BACKGROUND

As people conduct their daily lives, there are many times at which people would appreciate receiving personal reminders or notifications. For example, a working adult may appreciate a reminder that they need to stop and pick up groceries on their way home from work, or that they should schedule a doctor or dentist appointment soon. Some people tend to rely on their own memories for many such events, but as people engage in their busy daily lives, it is often difficult to rely on memory alone. People may also use rudimentary ways to remind themselves, such as by posting notes in their work environment, or by writing such events in a daily planner. Some may leverage computer technology, such as by scheduling reminders in a calendar tool, or by entering alarms in their mobile devices. However, such methods may prove unsuccessful for certain types of notifications.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
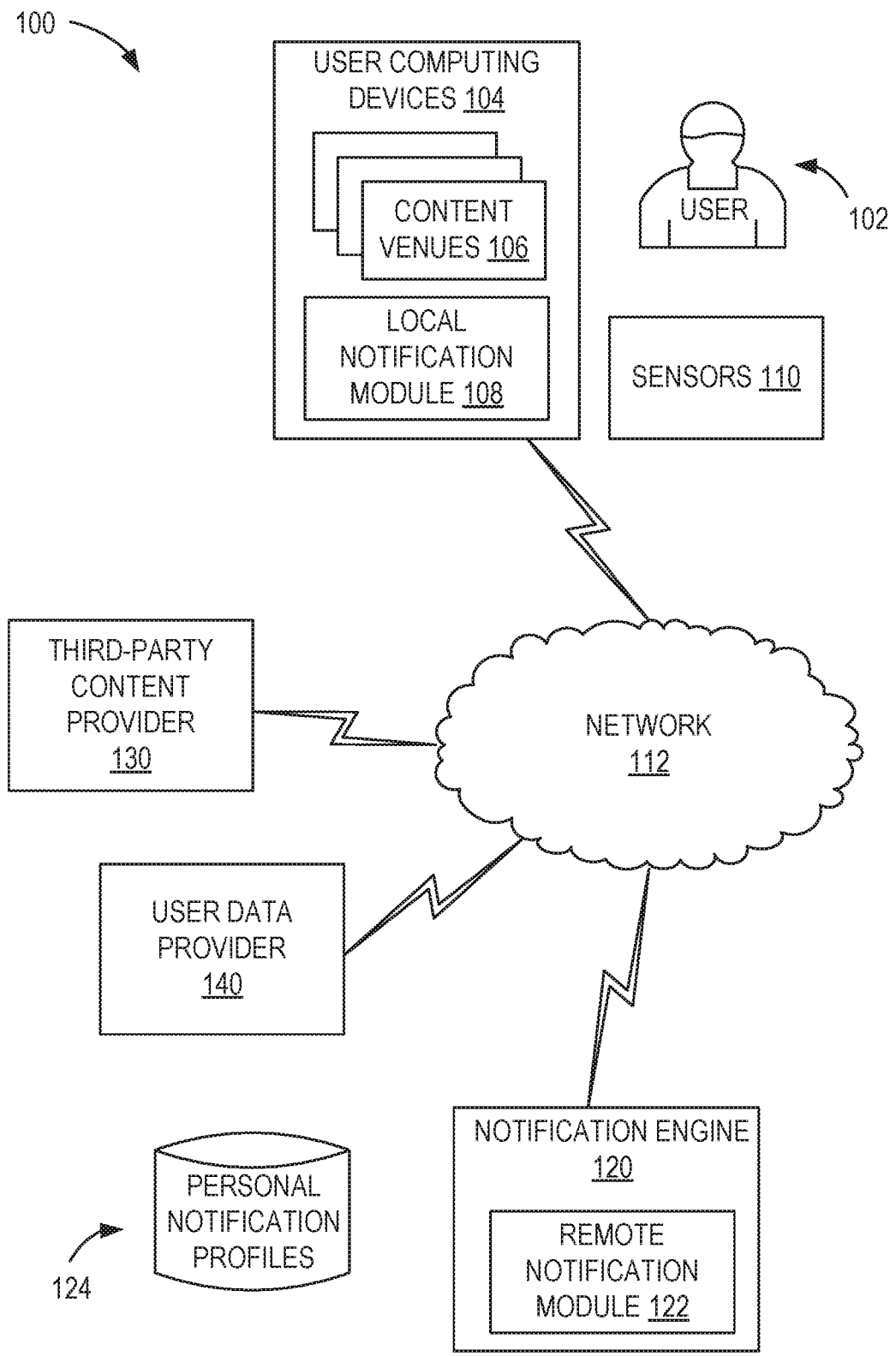
FIG. 1 illustrates an example networked environment including components of a notification system for providing notifications to a user.

The systems and methods described herein, for example, describe a technical solution for providing notifications to a user. In some embodiments, the system may allow the user to configure notifications for themselves (e.g., based on sensor-triggered events). In some embodiments, the system may provide the notifications in the form of self-directed advertisements to be presented to the user through ad venues upon certain events.

The user may desire to receive notifications (e.g., "reminders") about certain matters (referred to herein as "notification matters"). For example, the user may wish to be reminded to schedule a doctor's appointment, or to revisit their retirement savings plan. In one example embodiment, the user may be conscious of their retirement plan, and may wish to receive notifications based on matters that may impact their retirement portfolio. For example, the user may wish to receive a periodic reminder to revisit their 401k contribution percentage, or to evaluate the performance of their retirement portfolio. The user may also wish to receive notifications when their conduct potentially impacts their retirement plan. For example, if the user regularly spends money on a frivolous or luxury items (e.g., lease on a luxury automobile, or excessive dining events), then the user may wish to receive notifications that their conduct may impact their retirement plan.

A notification system is described herein that allows the user to configure various types of notifications for these and other such matters. Some notifications may be configured to be triggered based on time (e.g., periodically, or at particular times). Some notifications may be triggered based on sensor data (e.g., detecting that the user is proximate a particular location via GPS data, or detecting that the user's exercise level is below a pre-determined threshold via a wearable health sensor). Some notifications may be triggered based on computer-generated data (e.g., spending data), or real-world data (e.g., news data or market data). The user may configure both the matters on which they are notified, as well as the venue of delivery for the personal notification. As such, the notification system enables the user to notify themselves, and in some cases, automatically self-police their own conduct.

In some situations, the user may interact with multiple computing devices throughout their day. For example, the user may operate a desktop computer during their work day, they may carry a smartphone around on their person through much of the day, they may operate a tablet computer while commuting or while relaxing at home, and they may watch a smart television while at home. Each of these computing devices represent devices through which the notification system may present notifications to the user. These various devices of the user are referred to herein as "notification devices". In one example embodiment, the notification system detects which device or devices the user is currently engaged with and presents notifications to the user based on their current engagement with the "target" notification device.

Further, within each target notification device, there may be several "application venues" in which notifications may be presented to the user. In one example embodiment, the notification system presents notifications to the user through "advertisement venues". Many known application venues present advertisement content to users. For example, a typical web page may include advertisement space along the right edge of the page, or a mobile application may present an advertisement prior to allowing the user to access the application, or an online content service may present an advertisement video prior to providing access to online content.

The notification system described herein may use these advertisement venues to present the notifications to the user. In some embodiments, the notification system may replace an "external advertisement" with the notification. For example, the notification system may remove advertisement content from an advertisement pane of a web page and inject notification content into that advertisement pane, thereby causing the user to view the notification instead of the external advertisement. In other embodiments, the external advertisement content may be provided by a third-party content provider, and the notification system may facilitate displaying the notification to the user through the third-party content provider (e.g., providing the notification content to the third-party content provider, which then provides the notification to the user when the application venue would otherwise have provided some external advertisement). As such, the user receives self-configured reminder notifications, and through venues which might normally contain advertisements. This may be seen as a way to advertise to oneself.

FIG. 1 illustrates an example networked environment including components of a notification system 100 for providing notifications to a user 102. In an example embodiment, the notification system 100 includes an notification engine 120 communicatively coupled to one or more user computing devices 104 (e.g., a smartphone, a laptop or desktop personal computer, a tablet device, a smart TV, wearable computing devices, and so forth). The computing devices 104 include a local notification module 108 and one or more content venues 106, and may include one or more sensors 110.

In an example embodiment, the content venues 106 include software components that are configured to provide digital content, such as advertisements, to the user 102 through audio or visual display devices (not separately shown in FIG. 1) of the user computing devices 104. Content venues 106 may include, for example, web browsers, software applications (e.g., mobile apps), video or audio players, and so forth. Through the content venues, the user 102 may consume digital content such as web pages, computer games, social media, network-based applications, music, videos, and so forth. While consuming such digital content, the user may also be presented with advertisements within these content venues. For example, a third-party content provider 130 may be an online content provider that provides digital content of interest to the user 102, or the third-party content provider 130 may be a third-party ad serving company configured to provide advertisements to the user 102 in conjunction with other digital content.

In an example embodiment, the user computing devices 104 may also be in communication with or otherwise include one or more sensors 110. Sensors 110 may include a global positioning system (GPS) receiver configured to determine a location of the user 102, or health/fitness sensors such as biometric sensors (e.g., tracking heart rate, number of steps, blood pressure, level of exercise, and so forth). Sensor data from sensors 110 may be used to configure certain notifications, as described in further detail below.

In an example embodiment, the notification engine 120 includes a remote notification module 122 configured to operate in conjunction with the local notification modules 106 of the user computing devices 104 to perform notification functionality as described herein. The notification engine 120 is communicatively coupled to the user computing devices 104 through a network 112 such as the Internet. The notification engine 120 is executed by a computing device remote from the user computing devices 104 (e.g., a server system, not separately depicted). In some embodiments, the notification engine 120 may be executed by one or more of the user computing devices 104. In some embodiments, the notification engine 120 and the user computing devices 104 may also be communicatively coupled to a third-party content provider 130 that provides digital content (e.g., advertisements) via the network 112, or a user data provider 140 that provides various types of data about the user 102 (e.g., retirement data, payment transaction data, income data, investment data, mortgage data, and so forth).

The notification engine 120 also includes personal notification profiles 124. In the example embodiment, the personal notification profiles 124 are stored in a database (not separately shown), such as a configuration file or a relational database. The personal notification profiles 124 store configuration information associated with notifications as configured by the user 102. The personal notification profile 124 data may be stored on the user computing devices 104, or remote from the user computing devices 104 (e.g., on a remote server device).

During operation, the notification system 100 allows the user 102 to configure notifications that they wish to receive (e.g., as a personal notification profile 124). In an example embodiment, the notification system 100 is configured to provide various monitoring and notification functionality surrounding retirement planning for the user 102. The user 102 may, for example, configure the notification system 100 to monitor spending habits of the user 102 (e.g., how much the user spends eating out), or a level of physical activity of the user 102 (e.g., how many steps the user walks each day), or locations visited by the user 102 (e.g., how many times the user goes to the gym, or visits a coffee house), or aspects associated with their retirement portfolio (e.g., how long it has been since the user 102 reviewed their retirement portfolio, or the performance of their retirement investments). The notification engine 120 collects data necessary to monitor each of the notification matters and, upon detecting satisfaction of notification criteria, the notification engine 120 provides a notification to the user 102 through one of the user computing devices 104.

Figure 2:
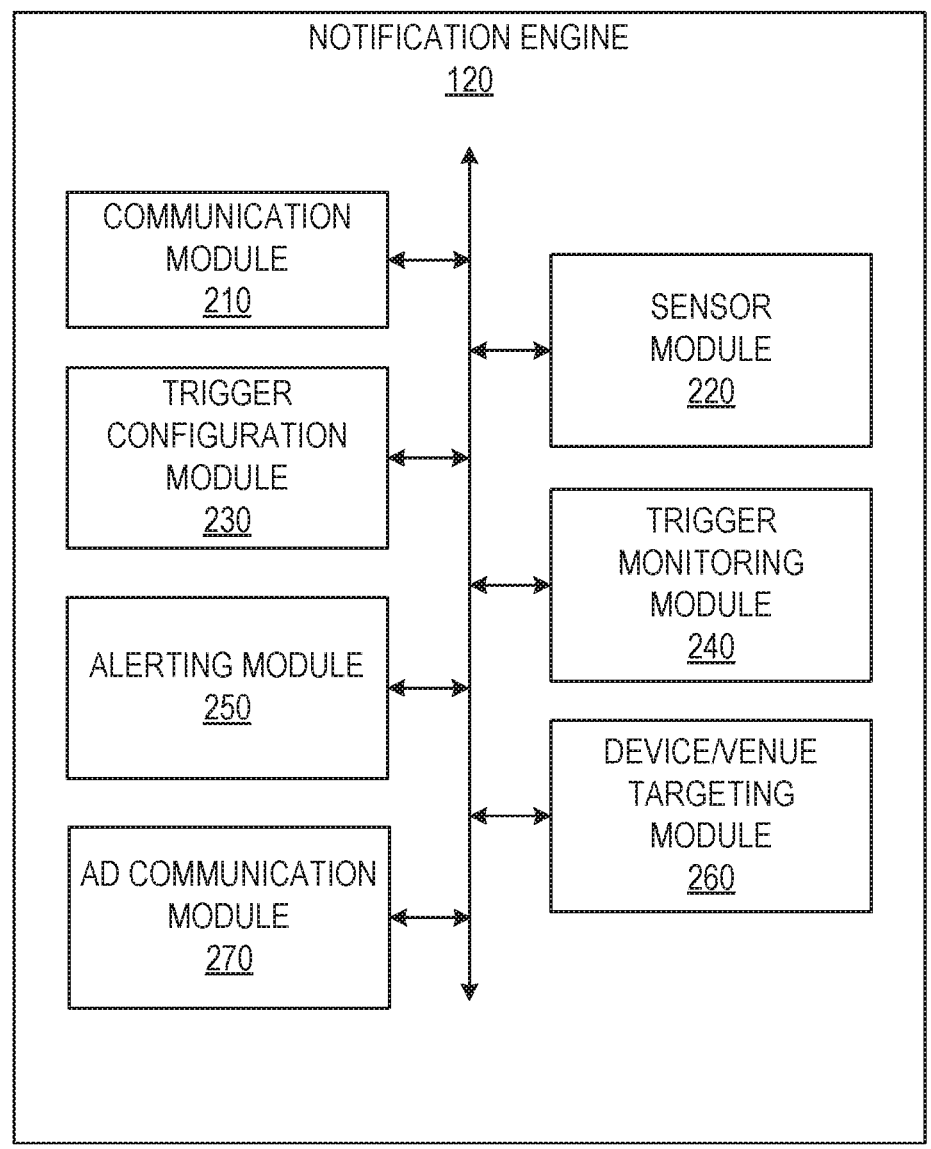
FIG. 2 is a block diagram showing components within the notification engine, according to some embodiments.

FIG. 2 is a block diagram showing components within the notification engine 120, according to some embodiments. The notification engine 120 may be hosted on dedicated or shared server machines (not shown) that are communicatively coupled to facilitate communications between the server machines. The components themselves may be communicatively coupled to each other and to various data sources, so as to allow information to be passed among the components or so as to allow the components to share and access common data. Furthermore, the components may access one or more databases (e.g., personal notification profiles 124) via database servers (not separately shown). In the example embodiment, the notification engine 120 includes a communication module 210, a sensor module 220, a trigger configuration module 230, a trigger monitoring module 240, an alerting module 250, a device targeting module 260, and an ad communication module 270, each of which is a component of the remote notification module 122 shown in FIG. 1. In some embodiments, the local notification module 108 may include one or more of the modules 210, 220, 230, 240, 250, 260, and 270.

The communication module 210, in an example embodiment, provides network communication functionality between the notification engine 120 and other computing devices, such as the user computing device 104, the third-party content provider 130, and the user data provider 140. In some embodiments, the communication module 210 facilitates communication over the Internet (e.g., the network 112) or other Internet Protocol (IP) based networks (e.g., IEEE 802 standards). In some embodiments, the communication module 210 facilitates communication to devices over cellular networks (e.g., to smartphone or tablet devices over a 3G/4G network). In other embodiments, the communication module 210 allows the notification engine 120 to communicate over both IEEE 802 standard-based network and a cellular network at the same time (e.g., connects to the inquiring user computing device 104 over the cellular network and connects to third-party websites over the 802 network).

In an example embodiment, the sensor module 220 provides functionality associated with analysis of sensor data of the user 102 from the sensors 110. The sensor data may come from a variety of types of sensors, such as GPS receiver data (e.g., providing location data associated with the user computing devices 104) and biometric data (e.g., health and fitness data of the user 102). The sensor module 220 may receive raw data values from the sensors 110, and may analyze these values in conjunction with particular types of tracking that may be performed for certain types of notifications.

In an example embodiment, notification triggers include one or more trigger conditions, as well as notification content. The trigger conditions of a particular notification trigger represent conditions that, once satisfied, will trigger a notification event. Notification content represents the content presented to the user 102 during the notification event. The notification event represents the process of presenting notification content to the user 102. In other words, once the trigger conditions are met, a notification event occurs, and the notification content is presented to the user. Each trigger condition may use one or more data sources to determine when the trigger condition is satisfied. The data sources referenced for these trigger conditions are referred to herein as trigger data sources, and the data received from these trigger data sources may be referred to herein as values.

The configuration module 230 allows the user to manage their notification triggers. For example, the configuration module 230 may provide a graphical user interface (GUI) that allows the user to create, edit, delete, activate, deactivate, or analyze history of the notification triggers within their personal notification profile 124. The user 102 may, for example, create a notification trigger to monitor their spending habits with regard to dining out, and its potential impact on their retirement plan. This may include capturing payment card data of the user 102 related to dining merchants and comparing that data to a pre-determined threshold (e.g., a weekly or monthly threshold set by the user 102, or based on the retirement plan of the user 102). The configuration module 230 may also allow the user to view data and data sources associated with notification triggers. For example, the configuration module 230 may allow the user 102 to view historical sensor data from their FitBit, or geolocation data from their smartphone, or transaction data from their payment cards, or investment performance data from their portfolio.

The trigger monitoring module 240, in an example embodiment, monitors active notification triggers from the personal notification profile 124 of the user 102. For example, the trigger monitoring module 240 may regularly (e.g., periodically) collect the dining transaction data of the user 102, or may automatically receive the dining transaction data (e.g., from a payment card provider at or after a transaction at a dining merchant), or may periodically retrieve fitness data or location data from the sensors 110 or the user computing devices 104. With the trigger data is received, the trigger monitoring module 240 compares the trigger data to the trigger conditions to determine whether or not to initiate a notification event. In other words, the trigger monitoring module 240 determines whether or not to notify the user 102.

The alerting module 250, in an example embodiment, performs the notification of the user 102 once a notification event occurs. For example, if the trigger monitoring module 240 determines that the user 102 has exceeded their monthly threshold for dining expenses, the alerting module 250 performs the notification of the user 102. In other words, the alerting module 250 causes the notification content from the notification trigger to be presented to the user 102.

In an example embodiment, the alerting module 250 transmits the notification content to the local notification module 108 of the user computing device 104, and the local notification module 108 presents the notification content to the user 102 via one of the content venues 106 available on that device 104.

In some embodiments, the notification engine 120 may select, from a pool of potential user computing devices 104, which user computing device 104 to use to present the notification content to the user 102. The device/venue targeting module 260 may perform the analysis and determination as to which user computing device 104 and which content venue 106 should be used to present the notification content. The pool of potential user computing devices 104 available to the notification system 100 is referred to herein as the "candidate pool of devices", and the device selected from the candidate pool of devices for a given notification event is referred to herein as the "target device". The pool of potential content venues 106 available on the target device is referred to herein as the "candidate pool of content venues", and the content venue selected from the candidate pool of content venues for a given notification event is referred to herein as the "target content venue".

In some embodiments, the target content venue may be an advertisement space controlled by a third-party content provider 130. For example, the target content venue may be an advertisement pane appearing on a third-party web site (not separately depicted), and that third-party web site may use the third-party content provider 130 to select the ad content presented to the user 102 within that advertisement pane. The ad communication module 270 may leverage the third-party content provider 130 to present the notification content to the user 120 after a notification event occurs. For example, after the notification event for the dining expense occurs, the device/venue targeting module 260 may select a desktop computing device of the user 102 as the target user computing device 104, and a web browser on the target user computing device 104 as the target content venue 106. As such, the ad communication module 270 may transmit the notification content to the third-party content provider 130 along with instruction to provide the notification content to the user 102. Later, the user 102 may be browsing the Internet and may access a third-party web site that uses the third-party content provider 130 for providing advertisements. Upon receiving an advertisement request for the user 102, the third-party content provider 130 may then provide the notification content as the "advertisement" to be presented to the user 102 as a part of the third-party web site content. As such, the notification content appears within the advertisement pane of the third-party web site through the web browser of target user computing device 104.

Figure 3:
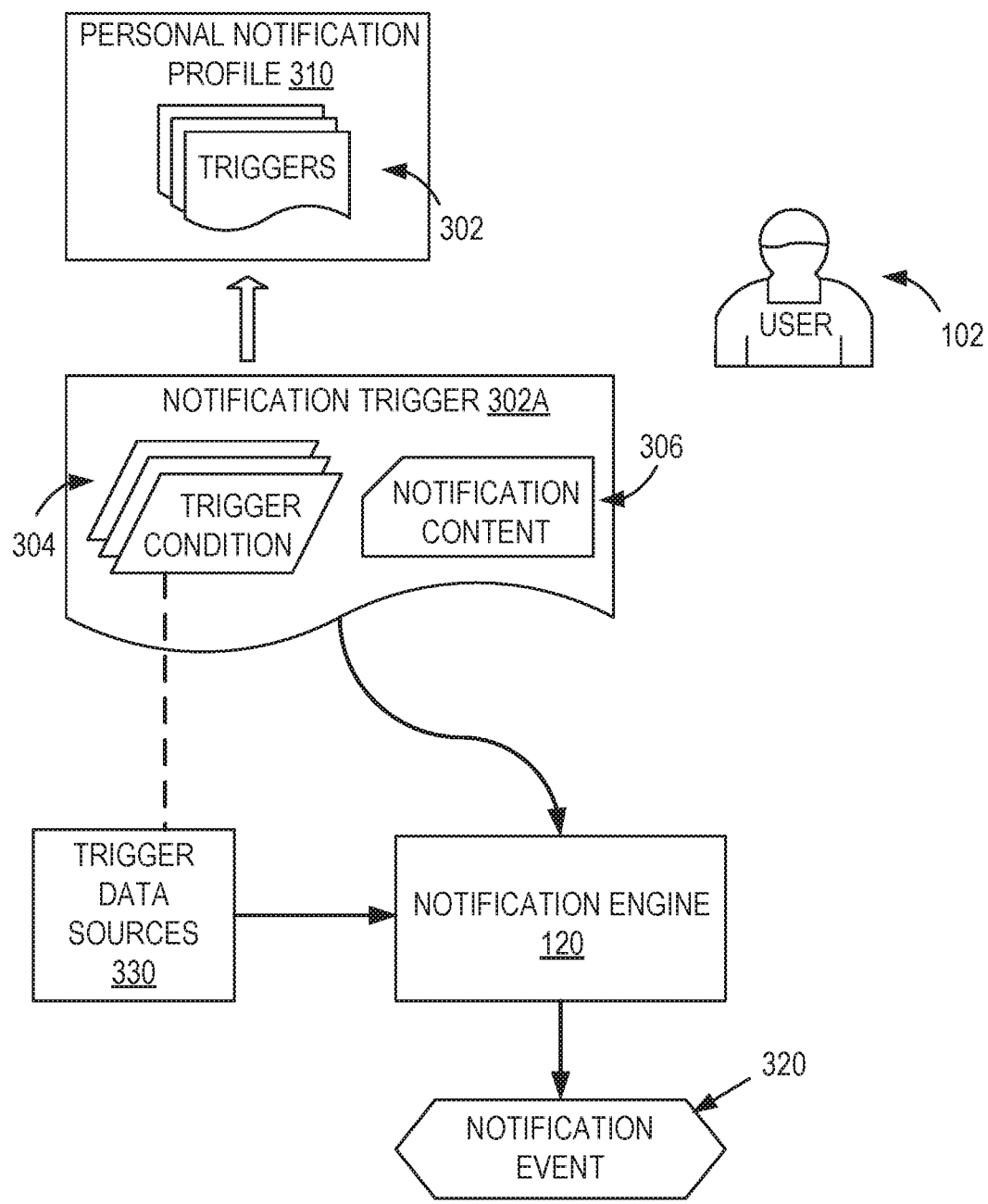
FIG. 3 is a workflow diagram of a notification trigger used by the notification engine to initiate a notification event.

FIG. 3 is a workflow diagram of a notification trigger 302A used by the notification engine 120 to initiate a notification event 320 within the notification system 100. In an example embodiment, the user 102 configures multiple notification triggers 302 as a part of a personal notification profile 310. The personal notification profile 310 may be similar to the personal notification profiles 124. Each notification trigger 302, such as notification trigger 302A, includes one or more trigger conditions 304 and notification content 306. As described above, notification triggers 304 represent a definition of the conditions that cause the notification content 306 to be presented to the user 102 (e.g., as a part of the notification event 320). Some trigger conditions 304 may use data from one or more trigger data sources 330 (the relationship of which is represented in FIG. 3 with a broken line). In an example embodiment, each of the triggers 302 is associated with some notification matter that relates in some way to retirement or retirement planning of the user 102.

During operation, the notification engine 120 allows the user 102 to create and manage the triggers 302 in their personal notification profile 310. For example, the user 102 may create the notification trigger 302A to include a trigger condition 304 such as "length of time since last review of retirement portfolio>120 days", and the notification content 306 may be text or an image including text identifying how many days it has been since the user 102 has last reviewed their retirement portfolio, or a reminder to revisit their retirement portfolio. As such, the trigger condition 304 may access a retirement system (e.g., as the trigger data source 310) which manages the retirement portfolio of the user 102 (e.g., via an application program interface (API)) to access how long it has been since the user 102 last reviewed their retirement portfolio.

In some embodiments, some triggers 302 may be created by the user 102, and other triggers 302 may be created by the notification engine 120. Further, multiple triggers 302 may be created as a part of the personal notification profile 310 of the user 102. The triggers 302 may also include an active state, which may be enabled or disabled. When a trigger 302 is enabled, the notification engine 120 begins and continues to examine whether the trigger conditions 304 are met and, once met, the notification engine 120 generates a notification event 320 for that notification trigger 302. When a trigger 302 is disabled, the notification engine 120 does not generate notification events 320 for that notification trigger 302.

The notification content 306, trigger condition(s) 304, and trigger data sources 330 may be closely related. In an example embodiment, the notification content 306 represents the notification that the user 102 wishes to receive, and receipt of that message is configured by the user 102 predicated on some trigger condition(s) 304. The trigger conditions 304 reference some trigger data source(s) 310 that implicate the subject matter of the notification content 306. The notification engine 120 may be configurable to trigger on various different trigger conditions 304. In relation to retirement, for example, the notification triggers 302 may relate to a retirement portfolio of the user 102, or spending habits of the user 102, or the health of the user 102.

Regarding retirement portfolio related notifications, the user 102 may wish to monitor aspects of their retirement plan in order to, for example, ensure that they are properly planning for their own retirement. The notification engine 120 may allow the user 102 to create notifications based on their retirement portfolio's performance. For example, some notification triggers 302 may alert the user 102 when their portfolio's value has decreased by a pre-determined amount or percentage, or when their portfolio's value has decreased enough to impact their current retirement plan, or when projected health care costs, housing costs, or utility costs have risen such as to impact their retirement plan. As such, trigger data sources 330 may include a retirement system managing the retirement portfolio of the user 102 (e.g., a system configured to provide current portfolio value, retirement plan data), or public or private systems providing projected costs data for health care, housing, or utilities.

The notification engine 120 may allow the user 102 to create notifications based on their management of their retirement portfolio. For example, some notification triggers 302 may be based on how long it has been since the user 102 viewed their retirement plan, or logged into their retirement account, or spoke with a financial advisor regarding their retirement portfolio or plan, or reviewed or altered their 401k contribution rate. As such, trigger data sources 330 may include the retirement system (e.g., for retirement account data), or an employer's system (e.g., for 401k contribution rate information).

Regarding spending habits of the user 102, the user 102 may wish to monitor how much they spend on certain types of expenses, or may wish to catch themselves before they make a purchase that significantly impacts their retirement plans. The notification engine 120 may allow the user 120 to create notifications based on payment card transaction data (e.g., how much the user 102 spends on entertainment, or fitness, or travel, or dining). The notification engine 120 may allow the user 102 to create notifications based on mortgage or other loan data (e.g., how much the user 102 spends per month on their home, or for how long, or how much the user 102 spends on automobiles, boats, or other loan-based purchases). The notification engine 120 may allow the user 102 to create notifications based on locations visited by the user 102 (e.g., how often they go to their favorite coffee house, or how often they go to the theater, or when they visit particular locations). As such, the trigger data sources 330 may include a payment card transaction processor system (e.g., for payment transaction data), or a loan provider (e.g., for mortgage or private loan information), or geolocation and geofencing information for the user computing devices 104 (e.g., for determining where the user 102 is or has been).

Regarding health of the user 102, the user 102 may wish to monitor aspects of their own health in order to, for example, maintain a proper focus on their fitness in order to extend their life, or to more accurately project their longevity (e.g., for purposes of more accurate retirement planning). The notification engine 120 may allow the user 120 to create notifications based on fitness activity level (e.g., how often they visit the gym, or how regularly they exercise, or their average blood pressure, or how often they eat poorly or consume alcohol or smoke, or how often or how far they walk). The notification engine 120 may allow the user 120 to create notifications based on health management (e.g., how often they visit the doctor or dentist, how much they spend on health care). As such, trigger data sources 330 may include biometric sensors from wearable devices (e.g., for biometric readings of the user 102), or geolocation and geofencing information for the user computing devices 104 (e.g., for determining where the user 102 is or has been), or transaction data (e.g., for how often particular types of goods were purchased).

As described above, trigger data sources 330 may include various systems, including third-party systems. The notification engine 120 may access such data via APIs to the trigger data sources 330, or any other communications methods that enable the systems and methods described herein. In some embodiments, the sensors 110 of the user computing devices 104 may provide sensor data such as biometric sensor data of the user 102, or geolocation data associated with the location of the user computing device 104. The trigger data sources 330 may include the user data providers 140.

In addition to the trigger conditions 304, and as a part of the notification trigger 302, the user 102 also identifies the notification content 306 to be displayed to the user 102 when the notification event 320 occurs. In some embodiments, the notification engine 120 provides default notification content 306 that may be selected for use with the notification triggers 302. For example, the notification engine 120 may provide an image that displays "FRIVOLOUS SPENDING ALERT" based on the user 102 walking into a BMW dealership, or "EXCEEDED DINING LIMIT FOR THE WEEK" based on a dining purchase on a payment card that put the user 102 over their predetermined threshold. In some embodiments, the notification content 306 may also include data associated with any of the trigger conditions 304. For example, the notification engine 120 may populate the "EXCEEDED DINING LIMIT FOR THIS WEEK" alert with the current weekly dining total and the current threshold. In some embodiments, the notification engine 120 may allow the user 102 to customize the content, such as with text or an image provided by the user 102. For example, for a location-based trigger condition that triggers based on the user 102 being at a Starbucks location more than once on a given day, the user 102 may enter text into the notification content 306 saying "TOO MUCH COFFEE" or "SPENDING TOO MUCH ON COFFEE".

Once the notification trigger 302A is created, the user 102 may enable the notification trigger 302A. Upon enablement of the notification trigger 302A, the notification engine 120 begins to implement the notification trigger 302A. Implementation of the notification trigger 302A includes analyzing each trigger condition 304, collecting data from trigger data sources 330 used to resolve each trigger condition 304, and resolving whether the trigger conditions 304 are satisfied. If the trigger condition(s) 304 for the notification trigger 302A are satisfied, the notification engine 120 issues a notification event 320 for that notification trigger 302A. In some embodiments, the notification engine 120 analyzes the notification trigger 302A when first enabled. In some embodiments, the notification engine 120 allows the user 102 to specify when, or how frequently, the notification trigger 302A will be analyzed. In some embodiments, the notification engine 120 analyzes some or all of the triggers 302 from the personal notification profile 310 of the user 102 at a periodic interval (e.g., every hour, or every 5 minutes). In some embodiments, the notification engine 120 analyzes the notification trigger 302A based on receipt of data associated with one of the trigger conditions 304 (e.g., upon receipt of a payment card transaction for the user 102, or upon receipt of a location alert from the local notification module 108 of the user computing device 104).

Figure 4:
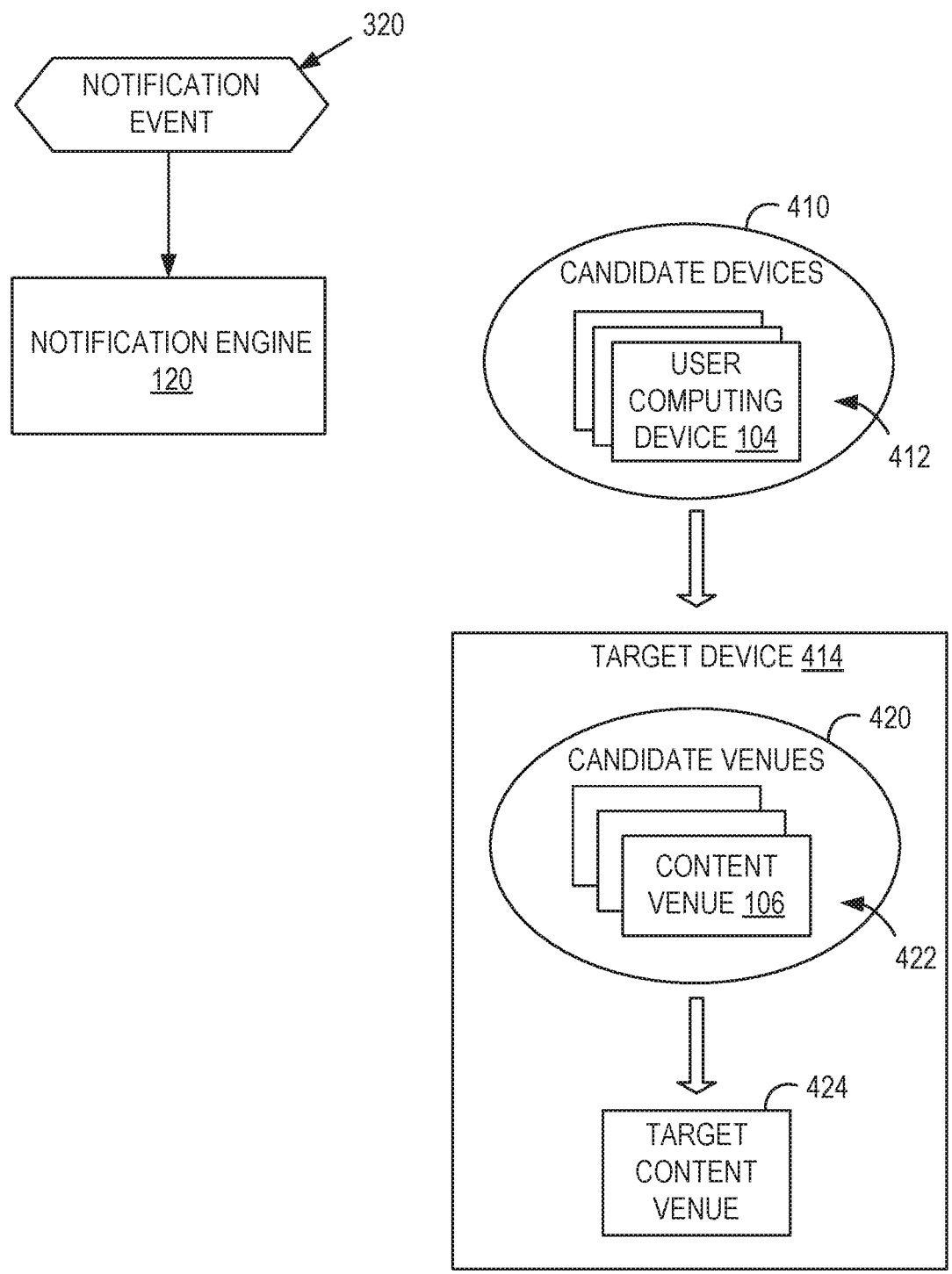
FIG. 4 is a workflow diagram illustrating device and content venue determination for the example notification event.
Figure 5:
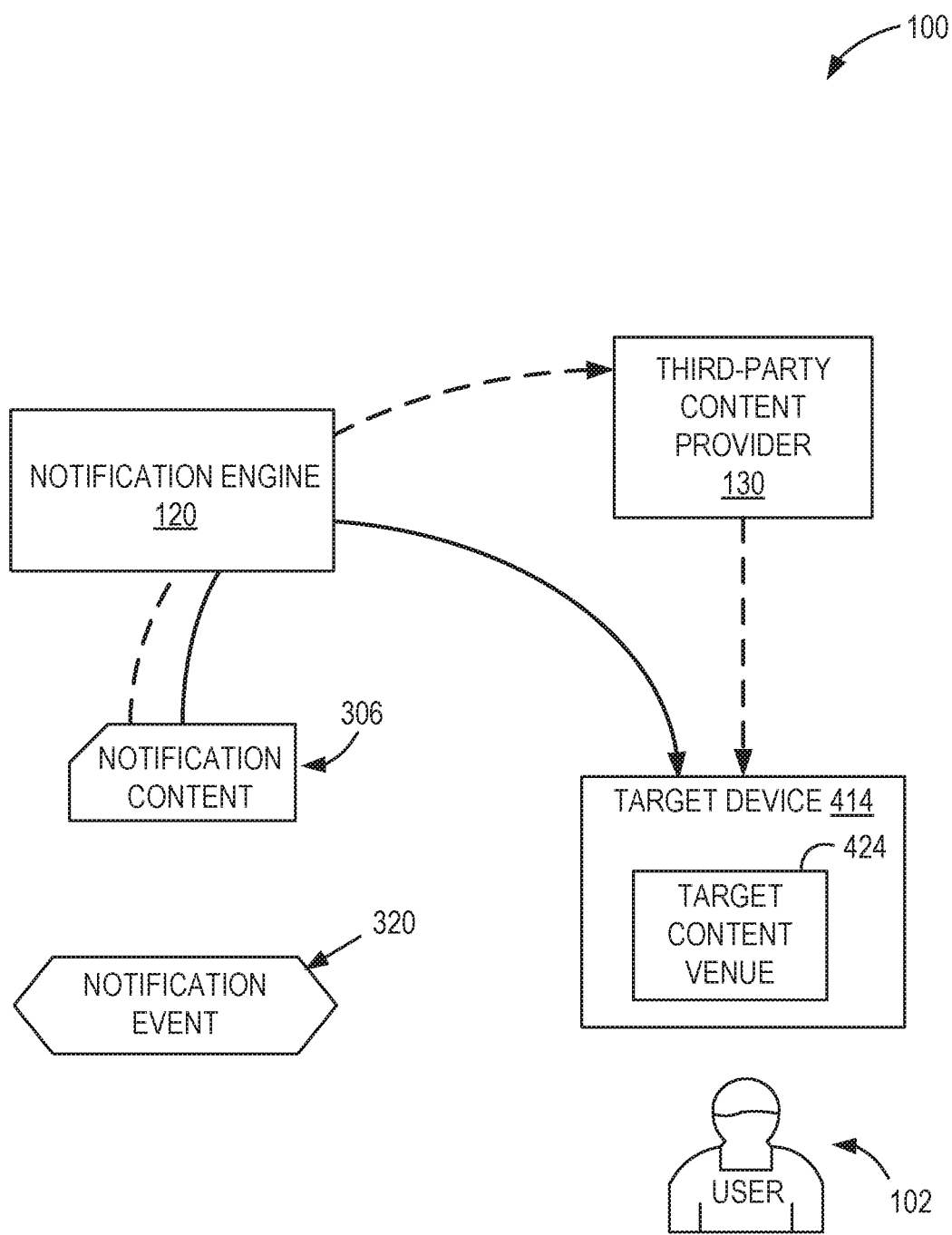
FIG. 5 is a workflow diagram for presenting the notification content to the user using the target device.

Once a notification event 320 has been initiated, the notification engine 120 processes the notification event in order to present the notification content 306 to the user 102. FIGS. 4 and 5 describe aspects of processing the notification event 320.

FIG. 4 is a workflow diagram illustrating device and content venue determination for the example notification event 320 within the notification system 100. In an example embodiment, the notification engine determines a target user computing device 414 and a target content venue 424 on that target user computing device 414 through which the notification content 306 will be presented to the user 102. More specifically, and as mentioned above, the user 102 may be associated with multiple user computing devices 104. For purposes of device and venue selection, these user computing devices 104 represent a pool 410 of candidate devices 412. In other words, these candidate devices 412 each represent a device through which the user 102 may be reached. After the notification event 320 occurs, the notification engine 120 selects one of the candidate devices 412 as the target device 414—the user computing device 104 to use for targeting presentation of the notification content 306 to the user.

In some embodiments, selection of the target device 414 from the pool 410 may be based on historical usage patterns of the user computing devices 104 by the user 102. For example, the notification system 100 may track, over a period of time, when the user 102 normally uses each device 104 through a typical day. As such, the notification engine 120 may select a candidate device 412 from the pool 410 that is more regularly used at the time of the notification event 320. This allows the notification engine 120 to target the notification on a device that is more likely to be used, thereby more likely to have the notification content 306 seen by the user 102. In some embodiments, selection of the target device 414 from the pool 410 may be based on the media type of the notification content 306. Some devices may be unable to present certain types of content (e.g., a smart car radio may be unable to display video content), or some devices may be less favorable for presenting certain types of content (e.g., a smart watch may have too small of a display surface area to adequately present a video with detailed content). As such, the notification engine 120 may avoid selecting such devices from the candidate devices 412, or may remove such devices from the pool 410. In some embodiments, the notification engine 120 may select the target device 414 based on current use. For example, if the user 102 is currently interacting with their smartphone, but they have not been active on their desktop computer in 2 minutes, or have not been active on their tablet device in 6 hours, then the notification engine 120 may select the smartphone as the target device 414. As such, the notification content 306 may be more likely to be presented to the user 102 in a more timely manner. In some embodiments, the notification engine 120 may select the target device 414 based on geographic location. For example, the notification trigger 302A may be configured to target the notification content for presentation when the user 102 is at a specific location, such as a bank branch. As such, the notification content 306 may be staged for one of the candidate devices 412 that historically has been at bank branch locations. In some embodiments, the user 102 or the notification system 100 defines a default user computing device 104 as the target device 414 for receiving notification content 306. The default target device 414 may be altered by the notification system 100 based on any of the above-described criteria.

Once a target device 414 is identified, the target device 414 defines a pool of one or more content venues 106 available on the device 414. For purposes of device and venue selection, these content venues 106 represent a pool 420 of candidate venues 422. The notification engine 120 selects one of the candidate venues 422 as the target content venue 422—the content venue 106 on the target device 414 to use for targeting presentation of the notification content 306 to the user 102.

In some embodiments, the notification engine 120 may select the target content venue 424 based on historical usage patterns of the candidate content venues 422. For example, on the smartphone of the user 102, the user 102 may, on average, use a social media app every 15 minutes during waking hours, and may use a news app twice daily. As such, the notification engine 120 may select the social media app as the target content venue 424. In some embodiments, the notification engine 120 may select the target content venue 424 based on the media type of the notification content 306. For example, if the notification content 306 is text-based, then a video player content venue 106 may not be able to present the text-based notification content 306, and may be excluded from selection as the target content venue 424, or excluded from the pool 420 of candidate venues 422. In some embodiments, the notification engine 120 may select the target content venue 424 based on current use. For example, within the smartphone of the user 102, the user 102 may be currently using a particular third-party app that presents ads to the user 102, and may have a browser app running but not have used the browser app in the last 10 minutes. As such, the third-party app may be selected as the target content venue 424 (e.g., possibly reaching the user 102 in a more timely fashion). In some embodiments, the user 102 or the notification system 100 defines a default content venue 106 on the default user computing device 104 for receiving notification content 306. The default target content venue 424 may be altered by the notification system 100 based on any of the above-described criteria.

In the example illustrated in FIG. 4, the notification engine 120 first identifies the target device 414 and then, based on the target device, determines the target content venue 424. In other embodiments, the notification engine 120 may identify the target content venue 424 from another pool of candidate content venues, and that target content venue 424 defines the target device 414. For example, presume the notification content 306 is audio. As such, the notification engine 120 may identify only content venues 106 of the user computing devices 104 that support audio as the candidate venues of the pool. Since each content venue 106 is associated with a particular user computing device 104, the selection of a particular content venue 106 as the target content venue 424 thus identifies the target device 414. In some embodiments, the notification engine 120 may further use any of the above-described methods for selecting the target venue 424 or associated target device 414 from the pool of candidate venues (e.g., based on historical usage patterns or current usage).

FIG. 5 is a workflow diagram for presenting the notification content 306 to the user 102 using the target device 414. In an example embodiment, after the notification engine 120 has identified the target device 414 and target content venue 424, the notification engine 120 transmits the notification content 306 to the target device 414 for presentation to the user 102 through the target content venue 424. FIG. 5 illustrates multiple methods for presenting the notification content 306 to the user 102.

In one embodiment, and illustrated in FIG. 5 with solid line, the notification engine 120 transmits the notification content 306 directly to the target device 414. For example, the remote notification module 122 may transmit the notification content 306 over the network 112 (e.g., a 3G/4G cellular network, the Internet) to the local notification module 108 on the target device 414, and on into the target content venue 424.

In another embodiment, and illustrated in FIG. 5 with broken line, the notification engine 120 may partner with the third-party content provider 130. As mentioned above, the third-party content provider 130 may be an advertising system configured to present advertising content to various users in various venues, such as ads presented in mobile apps or ads presented on web pages. Transmission of the notification content 306 to the third-party content provider 130 also identifies one or more of the user 102, the target device 414, and the target content venue 424. Once the notification content 306 is staged on the third-party content provider 130, the third-party content provider may later receive a request for advertisement content from the user 102, or from the target device 414, or from the target content venue 424 on the target device 414. Upon such request, and without a pending notification content 306, the third-party content provider 130 may have otherwise sent a third-party advertisement to the user 102 (e.g., based on an advertising campaign of a merchant, or based on known preferences of the user 102). In this example embodiment, the third-party content provider 130 determines that there is a pending notification content 306 for this user 102 or target device 414 and transmits the notification content 306 instead of a third-party ad. Upon receipt, the target device 414 presents the notification content 306 to the user 102 through the target content venue 424. As such, this embodiment enables the notification system 100 to present user-defined content to the user 102 through existing third-party content providers 130, and in existing content venues 424 that would typically present third-party advertisements.

Figure 6:
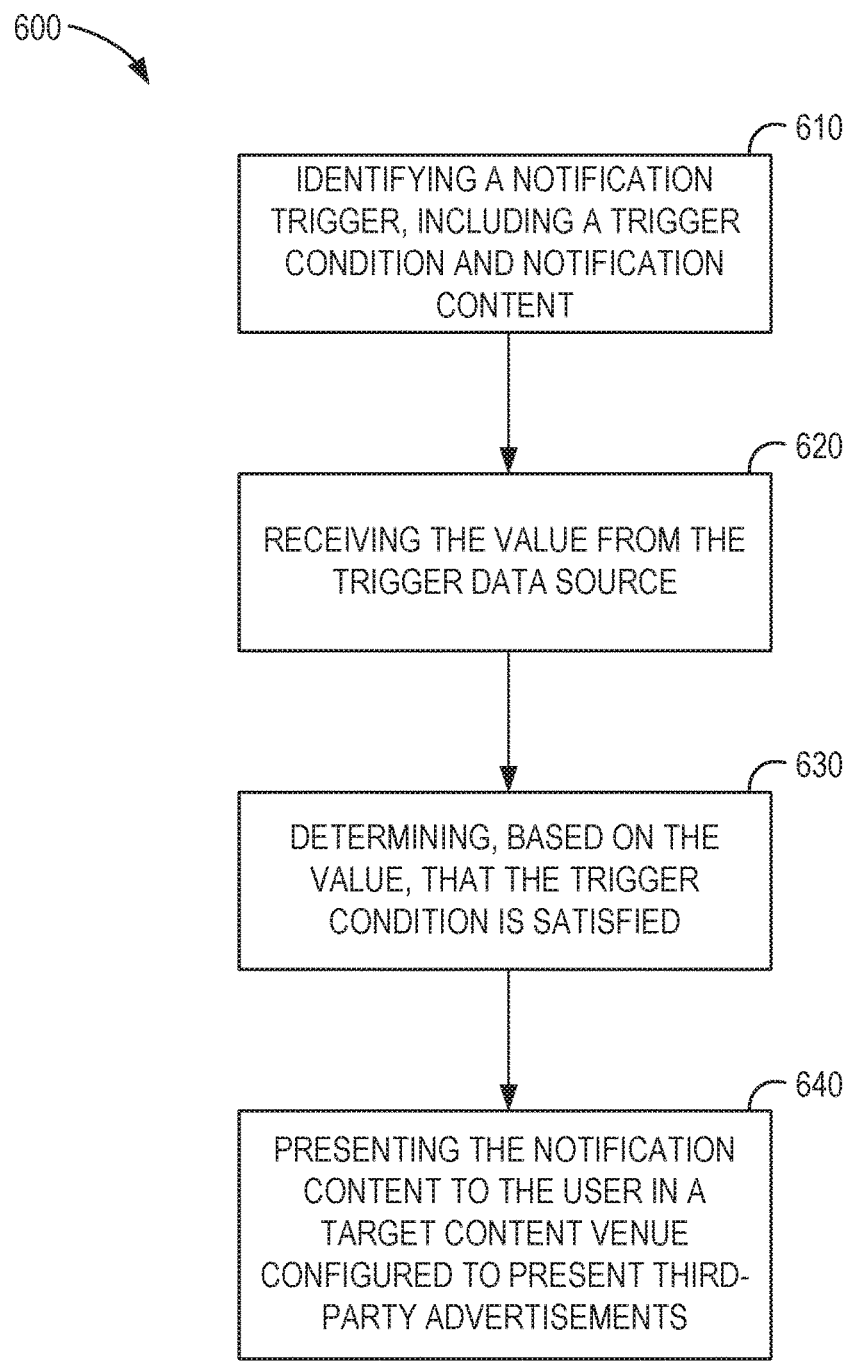
FIG. 6 illustrates an example computer-implemented method for presenting notifications to the user.

FIG. 6 illustrates an example computer-implemented method 600 for presenting notifications to the user 102. The computer-implemented method 600, hereafter referred to as "the method 600," is performed by a computing device comprising at least one hardware processor and a memory. In an example embodiment, the method 600 includes identifying a notification trigger configured by a user of a target computing device, the notification trigger including at least one trigger condition and notification content, the trigger condition references a value from a trigger data source and includes a condition based on the value, the notification content includes content provided by the user (see operation 610). The method 600 also includes receiving the value from the trigger data source (see operation 620). The method 600 further includes determining, based on the value, that the at least one trigger condition is satisfied (see operation 630). In some embodiments, the notification content pertains to retirement planning of the user, and the notification trigger is configured by the user to notify the user about a matter associated with their retirement plan.

The method 600 also includes presenting the notification content to the user on a target computing device associated with the user, the notification content is presented in a target content venue configured to present third-party advertisements to the user (see operation 640). In some embodiments, presenting the notification content to the user includes transmitting the notification content to a third-party content provider, the third-party content provider is configured to provide advertisement content to users as a service to other third-party content providers, the notification content is provided to the target computing device as advertisement content.

In some embodiments, the method 600 also includes receiving biometric sensor data from a biometric sensor associated with the user, and the trigger data source includes the biometric sensor, and the value includes the biometric sensor data from the biometric sensor. In some embodiments, the method 600 also includes selecting the target computing device from a plurality of candidate computing devices associated with the user based on one or more of (1) historical usage information of the candidate computing devices by the user and (2) current usage status of the candidate computing devices by the user. In some embodiment, the method 600 also includes selecting the target content venue from a plurality of candidate venues based on one or more of (1) historical usage information of the candidate venues by the user and (2) current usage status of the candidate venues by the user. In some embodiments, the method 600 also includes receiving geolocation data from a geolocation sensor associated with the target computing device, and the trigger data source includes the geolocation sensor, and the trigger condition compares a geofenced location and the geolocation data from the geolocation sensor.

Figure 7:
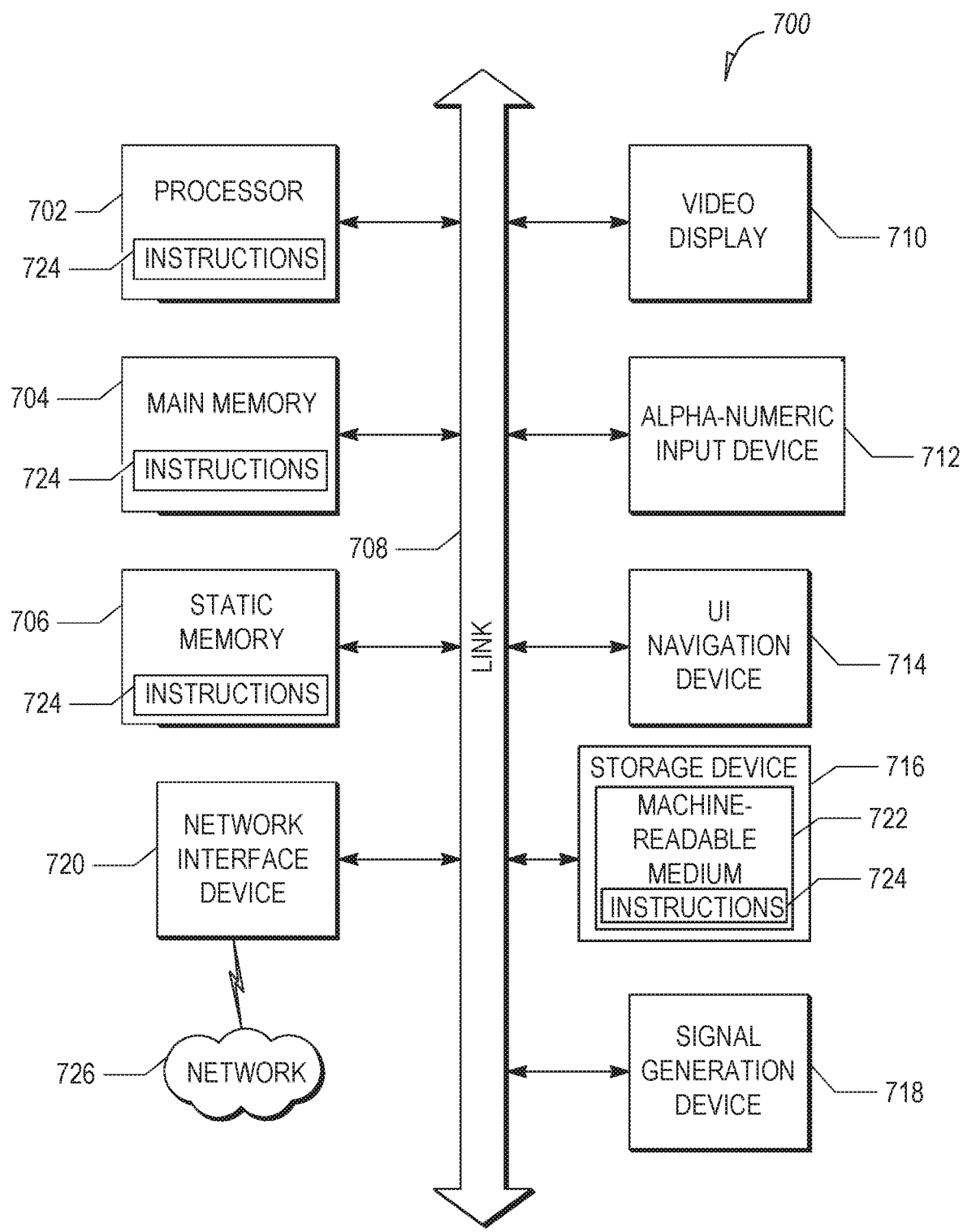
FIG. 7 is a block diagram illustrating a machine in the example form of a computer system, within which a set or sequence of instructions can be executed to cause the machine to perform any one of the methodologies discussed herein, according to an example embodiment.

FIG. 7 is a block diagram illustrating a machine in the example form of a computer system 700, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 can further include a video display unit 710, an alphanumeric input device 712 (e.g., a keyboard), and a user interface (UI) navigation device 714 (e.g., a mouse). In one embodiment, the video display unit 710, alphanumeric input device 712, and UI navigation device 714 are incorporated into a touch-screen display. The computer system 700 can additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 can also reside, completely or at least partially, within the main memory 704, within the static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" can include a single medium or multiple media (e.g., a centralized or distributed database, and/or associated caches and servers) that store the one or more instructions 724. The term "machine-readable medium" shall also be taken to include any tangible medium that is capable of storing, encoding, or carrying instructions (e.g., instructions 724) for execution by the machine and that cause the machine to perform any one or more of the methodologies of the present disclosure or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EE-PROM)) and flash memory devices; magnetic disks such as internal hard disks and removable disks; magneto-optical disks; and CD-ROM and DVD-ROM disks.

The instructions 724 can further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone service (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system comprising:
 at least one hardware processor; and
 a memory storing instructions that, when executed by the
  at least one hardware processor, cause the at least one
  hardware processor to perform operations comprising:
 identifying a notification trigger configured by a user of a target computing device, the notification trigger including at least one trigger condition and notification content, the trigger condition references a value from a trigger data source and includes a condition based on the value, the notification content includes content provided by the user;
 receiving the value from the trigger data source;

determining, based on the value, that the at least one trigger condition is satisfied; and presenting the notification content to the user on a target computing device associated with the user by:
selecting an advertisement venue as a target content venue from a plurality of candidate venues;
removing advertisement content from an advertisement pane of a web page of the advertisement venue; and
injecting the notification content into the advertisement pane.

2. The system of claim 1, the operations further comprising receiving biometric sensor data from a biometric sensor associated with the user,
wherein the trigger data source includes the biometric sensor, and
wherein the value includes the biometric sensor data from the biometric sensor.

3. The system of claim 1, the operations further comprising selecting the target computing device from a plurality of candidate computing devices associated with the user based on one or more of (1) historical usage information of the candidate computing devices by the user and (2) current usage status of the candidate computing devices by the user.

4. The system of claim 1, wherein selecting the target content venue from a plurality of candidate venues is based on one or more of (1) historical usage information of the candidate venues by the user and (2) current usage status of the candidate venues by the user.

5. The system of claim 1, wherein the notification content includes retirement content associated with the user, wherein the notification trigger is configured by the user to notify the user about a matter associated with their retirement plan.

6. The system of claim 1, the operations further comprising receiving geolocation data from a geolocation sensor associated with the target computing device,
wherein the trigger data source includes the geolocation sensor,
wherein the trigger condition compares a geofenced location and the geolocation data from the geolocation sensor.

7. A computer-implemented method comprising:
identifying a notification trigger configured by a user of a target computing device, the notification trigger including at least one trigger condition and notification content, the trigger condition references a value from a trigger data source and includes a condition based on the value, the notification content includes content provided by the user;
receiving the value from the trigger data source;
determining, based on the value, that the at least one trigger condition is satisfied; and
presenting the notification content to the user on a target computing device associated with the user by:
selecting an advertisement venue as a target content venue from a plurality of candidate venues;
removing advertisement content from an advertisement pane of a web page of the advertisement venue; and
injecting the notification content into the advertisement pane.

8. The method of claim 7, further comprising receiving biometric sensor data from a biometric sensor associated with the user,
wherein the trigger data source includes the biometric sensor, and
wherein the value includes the biometric sensor data from the biometric sensor.

9. The method of claim 7, further comprising selecting the target computing device from a plurality of candidate computing devices associated with the user based on one or more of (1) historical usage information of the candidate computing devices by the user and (2) current usage status of the candidate computing devices by the user.

10. The method of claim 7, wherein selecting the target content venue from a plurality of candidate venues is based on one or more of (1) historical usage information of the candidate venues by the user and (2) current usage status of the candidate venues by the user.

11. The method of claim 7, wherein the notification content includes retirement content associated with the user, wherein the notification trigger is configured by the user to notify the user about a matter associated with their retirement plan.

12. The method of claim 7, further comprising receiving geolocation data from a geolocation sensor associated with the target computing device,
wherein the trigger data source includes the geolocation sensor,
wherein the trigger condition compares a geofenced location and the geolocation data from the geolocation sensor.

13. A non-transitory computer-readable storage medium, the computer-readable storage medium including instructions that, when executed by a computer, cause the computer to perform operations comprising:
identifying a notification trigger configured by a user of a target computing device, the notification trigger including at least one trigger condition and notification content, the trigger condition references a value from a trigger data source and includes a condition based on the value, the notification content includes content provided by the user;
receiving the value from the trigger data source;
determining, based on the value, that the at least one trigger condition is satisfied; and
presenting the notification content to the user on a target computing device associated with the user by:
selecting an advertisement venue as a target content venue from a plurality of candidate venues;
removing advertisement content from an advertisement pane of a web page of the advertisement venue; and
injecting the notification content into the advertisement pane.

14. The non-transitory computer-readable storage medium of claim 13, wherein the operations further comprise receiving biometric sensor data from a biometric sensor associated with the user,
wherein the trigger data source includes the biometric sensor, and
wherein the value includes the biometric sensor data from the biometric sensor.

15. The non-transitory computer-readable storage medium of claim 13, wherein the operations further comprise selecting the target computing device from a plurality of candidate computing devices associated with the user based on one or more of (1) historical usage information of the candidate computing devices by the user and (2) current usage status of the candidate computing devices by the user.

16. The non-transitory computer-readable storage medium of claim 13, wherein the notification content includes retirement content associated with the user, wherein the notification trigger is configured by the user to notify the user about a matter associated with their retirement plan.

17. The non-transitory computer-readable storage medium of claim 13, wherein the operations further comprise receiving geolocation data from a geolocation sensor associated with the target computing device,
- wherein the trigger data source includes the geolocation sensor,
- wherein the trigger condition compares a geofenced location and the geolocation data from the geolocation sensor.

* * * * *